US009654533B2

(12) United States Patent
Kim et al.

(10) Patent No.: US 9,654,533 B2
(45) Date of Patent: May 16, 2017

(54) METHOD OF ADAPTIVELY DELIVERING MEDIA BASED ON RECEPTION STATUS INFORMATION FROM MEDIA CLIENT AND APPARATUS USING THE SAME

(71) Applicant: ELECTRONICS AND TELECOMMUNICATIONS RESEARCH INSTITUTE, Daejeon (KR)

(72) Inventors: Sung Hei Kim, Daejeon (KR); Chang Kyu Lee, Daejeon (KR); Shin Gak Kang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 147 days.

(21) Appl. No.: 14/156,972

(22) Filed: Jan. 16, 2014

(65) Prior Publication Data
US 2014/0201333 A1    Jul. 17, 2014

(30) Foreign Application Priority Data

Jan. 17, 2013  (KR) ................. 10-2013-0005362
Jan. 9, 2014   (KR) ................. 10-2014-0002639

(51) Int. Cl.
*G06F 15/16*    (2006.01)
*H04L 29/06*    (2006.01)
*H04W 64/00*    (2009.01)

(52) U.S. Cl.
CPC .............. *H04L 65/60* (2013.01); *H04L 65/80* (2013.01); *H04W 64/00* (2013.01)

(58) Field of Classification Search
CPC .................................................. H04W 64/00
USPC ........................................................ 709/219
See application file for complete search history.

(56) References Cited

U.S. PATENT DOCUMENTS

| 8,156,239 B1* | 4/2012 | Ashrafi | H04W 4/18 375/240.02 |
| 2005/0076136 A1* | 4/2005 | Cho | H04L 29/06027 709/231 |
| 2008/0144553 A1 | 6/2008 | Shao et al. | |
| 2011/0219138 A1* | 9/2011 | Cho | H04L 67/10 709/231 |
| 2011/0296046 A1* | 12/2011 | Arya | H04L 65/80 709/231 |

(Continued)

FOREIGN PATENT DOCUMENTS

| JP | 2003-249977 | 9/2003 |
| KR | 10-2010-0057622 | 5/2010 |
| KR | 10-2012-0138567 | 12/2012 |

*Primary Examiner* — Hamza Algibhah
(74) *Attorney, Agent, or Firm* — Staas & Halsey LLP

(57) ABSTRACT

Disclosed herein are a method of adaptively delivering media based on reception status information from a media client and an apparatus using the same. A media transmission method by a media transmission apparatus may include sending a message, including configuration information for media requested by a terminal, to the terminal, sending a media packet forming the media to the terminal, selecting a media packet having a transport characteristic corresponding to reception quality information for the media packet received from the terminal based on the reception quality information, and sending the selected media packet to the terminal.

11 Claims, 6 Drawing Sheets

(56) References Cited

U.S. PATENT DOCUMENTS

| | | | | |
|---|---|---|---|---|
| 2011/0307581 A1* | 12/2011 | Furbeck | H04L 65/1083 | 709/219 |
| 2012/0317189 A1* | 12/2012 | Einarsson | H04L 65/4084 | 709/203 |
| 2012/0324122 A1* | 12/2012 | Miles | H04L 65/4084 | 709/231 |
| 2013/0166768 A1* | 6/2013 | Gouache | H04L 65/00 | 709/231 |
| 2013/0326024 A1* | 12/2013 | Chen | H04L 65/4084 | 709/219 |
| 2014/0006635 A1* | 1/2014 | Braness | H04N 21/23439 | 709/231 |

\* cited by examiner

METHOD OF ADAPTIVELY DELIVERING MEDIA BASED ON RECEPTION STATUS INFORMATION FROM MEDIA CLIENT AND APPARATUS USING THE SAME Priority to Korean patent application number 10-2013-0005362 filed on Jan. 17, 2013 and 10-2014-0002639 filed on Jan. 9, 2014, the entire disclosure of which is incorporated by reference herein, is claimed.

BACKGROUND OF THE INVENTION

Field of the Invention

Embodiments of the present invention relate to a method of delivering, by a media server, suitable media or transforming the format of media and delivering the transformed media based on reception status information received from a client when the media server includes one or more media having different transport characteristics or sends media on which the format of content can be variably transformed in accordance with a service form to the client.

Discussion of the Related Art

Media may have various forms and have different characteristics when the media are transmitted. For example, high-picture quality media require a high transfer rate. In such high-picture quality media, a client needs to be able to be connected to a network over which media can be received at a high transfer rate. Furthermore, the client needs to be equipped with a capability capable of processing the high-picture quality media. Accordingly, the same content requires a different transfer rate and processing capability depending on picture quality.

If a client is a terminal having mobility, the terminal may have a different reception capability depending on an accessed network. Furthermore, if a network to which a terminal is connected is a low-speed network, such as a mobile communication network, the terminal can receive only low-quality media. If a network to which a terminal is connected is a high-speed network, such as 802.11n, the terminal can also receive high-quality media. Furthermore, the speed of a network itself may be problematic, but the Internet may have a different network transfer rate depending on a network traffic situation. Accordingly, in MPEG, Dynamic Adaptive Streaming over HTTP (hereinafter referred to as MPEG-DASH) technology has been standardized.

MPEG-DASH is technology in which media to be adaptively received by a terminal are selected and controlled. Only high-picture quality media may not be always received because low-picture quality media in addition to high-picture quality media can be received depending on a network environment. As one of methods for solving such a problem, Korean Patent Laid-Open Publication No. 10-2013-0127211 (Nov. 22, 2013) entitled "Adaptive Media Streaming Transmission Method and Apparatus for Multi network Environment" discloses that media data is generated by encoding specific content in a plurality of layers, the generated media data is separated into the layers, and the media data separated into the layers is streamed and transmitted to a media reception apparatus over a plurality of networks.

However, a media server needs to be able to dynamically send media having different transport characteristics depending on a terminal's reception capability. Accordingly, there is a need for a method of recognizing, by the media server, the status of the terminal and directly controlling media streaming.

SUMMARY OF THE INVENTION

An object of the present invention is to provide a method of adaptively delivering media based on reception status information from a media client, wherein a media server can dynamically send media or a media format that is most suitable for a terminal depending on a reception capability of the terminal which is changed in an environment in which the media server provides streaming service to a plurality of terminals at the same time.

Another object of the present invention is to provide an apparatus for adaptively delivering media based on reception status information from a media client, wherein a media server can dynamically send media or a media format that is most suitable for a terminal depending on a reception capability of the terminal which is changed in an environment in which the media server provides streaming service to a plurality of terminals at the same time.

In accordance with an aspect of the present invention, a media transmission method by a media transmission apparatus may include sending a message, including configuration information for media requested by a terminal, to the terminal, sending a media packet that forms the media to the terminal, selecting a media packet having a transport characteristic corresponding to reception quality information for the media packet received from the terminal based on the reception quality information, and sending the selected media packet to the terminal.

In accordance with an aspect, the media transmission apparatus may own a plurality of media having different transport characteristics.

In accordance with another aspect, the media may include media packets having two or more different transport characteristics.

In accordance with yet another aspect, the message including the configuration information may include at least one of information about a transport characteristic of the media and information about a method of sending the reception quality information for the media.

In accordance with yet another aspect, the media packet transmitted to the terminal may include time information about a point of time at which the media packet was transmitted.

In accordance with yet another aspect, the reception quality information may be measured based on at least one of time information about a point of time at which the media packet was transmitted and information about a time interval in which media packets are received.

In accordance with yet another aspect, the media transmission method further includes receiving a message including reception quality information and information about a network status of the terminal, prior to the selecting of the media packet.

In accordance with yet another aspect, the message including the reception quality information and the information about the network status of the terminal may include duration for which a reception status of the media packet was measured, a loss rate of the media packet received for the duration, an average interval in which two media packets are received for the duration, a time taken to send the media packet for the duration, a time when the terminal sent a status information message for the duration, a peak bit rate for the duration, and information about buffer fullness remaining in the terminal for the duration.

In accordance with another aspect of the present invention, a media transmission apparatus includes a generation unit for generating a message including configuration information for media requested by a terminal, a transmission unit for sending the generated message and a media packet forming the media to the terminal, a reception unit for receiving reception quality information for the media packet from the terminal, and a selection unit for selecting a media packet having a transport characteristic corresponding to the reception quality information, wherein the transmission unit may send the selected media packet to the terminal.

In accordance with yet another aspect of the present invention, a method of receiving, by a media reception apparatus, media may include receiving configuration information for the media from a media server, receiving a media packet that forms the media from the media server, measuring the reception quality of the media packet, sending a message including information about the measured reception quality to the media server based on the configuration information, and receiving a media packet having a transport characteristic corresponding to the reception quality from the media server.

In accordance with yet another aspect of the present invention, a media reception apparatus includes a reception unit for receiving configuration information for the media and a media packet that forms the media from a media server, a measurement unit for measuring reception quality of the media packet, and a transmission unit for sending a message including information about the measured reception quality to the media server based on the configuration information, wherein the reception unit may receive a media packet having a transport characteristic corresponding to the reception quality from the media server.

DETAILED DESCRIPTION OF THE EMBODIMENTS

Embodiments of the present invention are described more fully hereinafter with reference to the accompanying drawings. As those skilled in the art would realize, the described embodiments may be modified in various different ways, all without departing from the spirit or scope of the present invention. In order to clarify a description of the present invention, a description of parts not related to the description is omitted, and the same reference numbers are used throughout the specification to refer to the same or like parts In the entire specification, unless explicitly described to the contrary, the word "comprise" and variations, such as "comprises" or "comprising", will be understood to imply the inclusion of stated elements but not the exclusion of any other elements. Furthermore, the term ' . . . unit' described in the specification means a unit for processing at least one function or operation, and the unit may be implemented by hardware or software or a combination of hardware and software.

Figure 1:
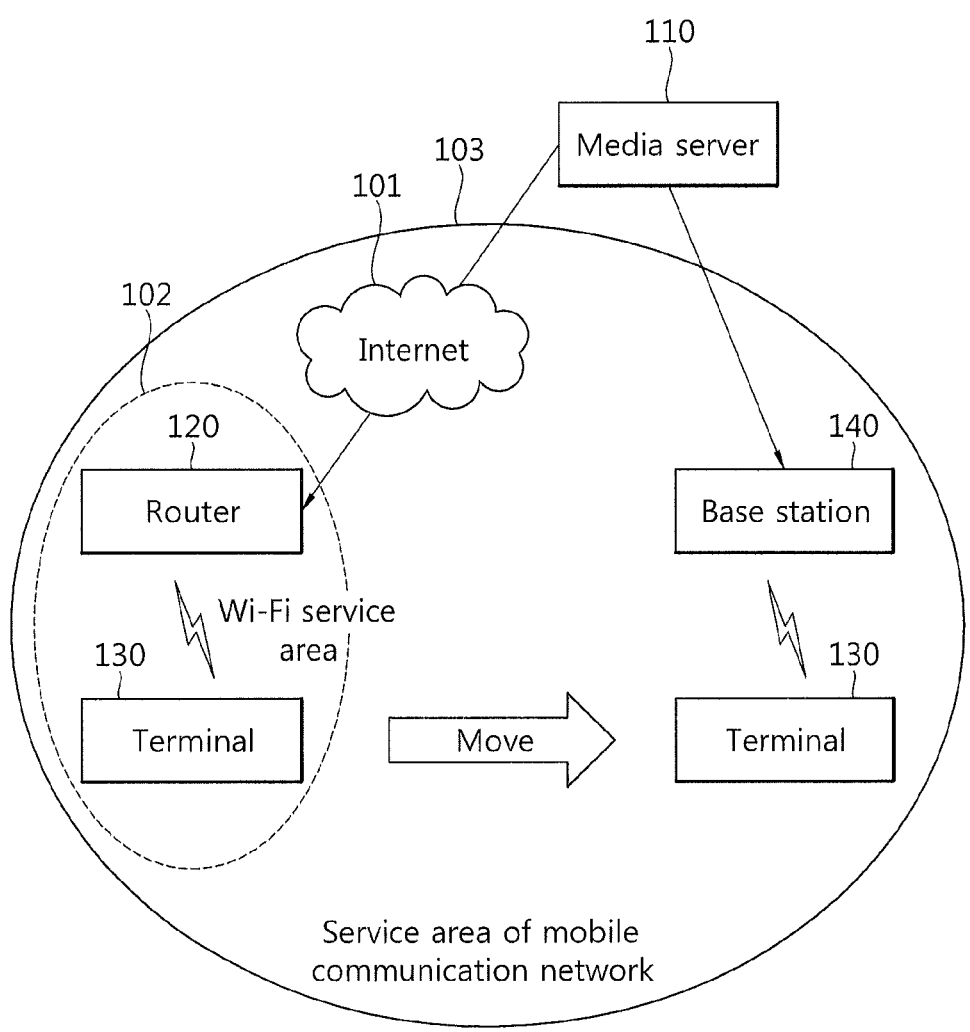
FIG. 1 is a diagram illustrating that the quality of media streaming service provided by a media server is changed as a terminal moves in accordance with an embodiment of the present invention.

FIG. 1 is a diagram illustrating that the quality of media streaming service provided by a media server is changed as a terminal moves in accordance with an embodiment of the present invention.

Referring to FIG. 1, the media server 110 provides media streaming service through an Internet 101 and over a mobile communication network. A router 120 connected to the Internet 101 provides Wireless-Fidelity (Wi-Fi) service. An area 102 in which the router 120 provides the Wi-Fi service may overlap with or may not overlap with the service area 103 of the mobile communication network. FIG. 1 shows an example in which the Wi-Fi service area 102 overlaps with the service area 103 of the mobile communication network.

The media server 110 can provide at least one type of media streaming service, and a terminal 130 provided with the media streaming service from the media server 110 can have a mobility function. The terminal 130 having the mobility function tries to be provided with service through Wi-Fi when the terminal 130 is placed in the Wi-Fi service area 102 in which Wi-Fi service can be provided. This is because the Wi-Fi service is free or very cheaper than a usage fee for the network data of the mobile communication network, the Wi-Fi service has very excellent performance, and thus high-quality media streaming service can be provided cheaply or free of charge. Furthermore, since the amount of high-quality media is very greater than that of low-quality media, high-quality media streaming service cannot be normally provided if a network status is poor or a terminal has a low processing capability.

When the terminal 130 is placed in the Wi-Fi service area 102, the terminal 130 can be provided with high-quality media streaming service from the media server 110 through the router 102. If the terminal 130 is moved and placed in the service area 103 of the mobile communication network, the terminal 130 can be provided with relatively low-quality media streaming service from the media server 110 through a base station 140. The terminal 130 may be selectively provided with high-quality media streaming service over the mobile communication network, but there is a significant difference in terms of a network usage cost as compared with a case where low-quality media streaming service because the amount of high-quality media is greater than that of low-quality media. The mobile communication network may not provide high-quality media streaming service sometimes because it has poor network performance than Wi-Fi.

Figure 2:
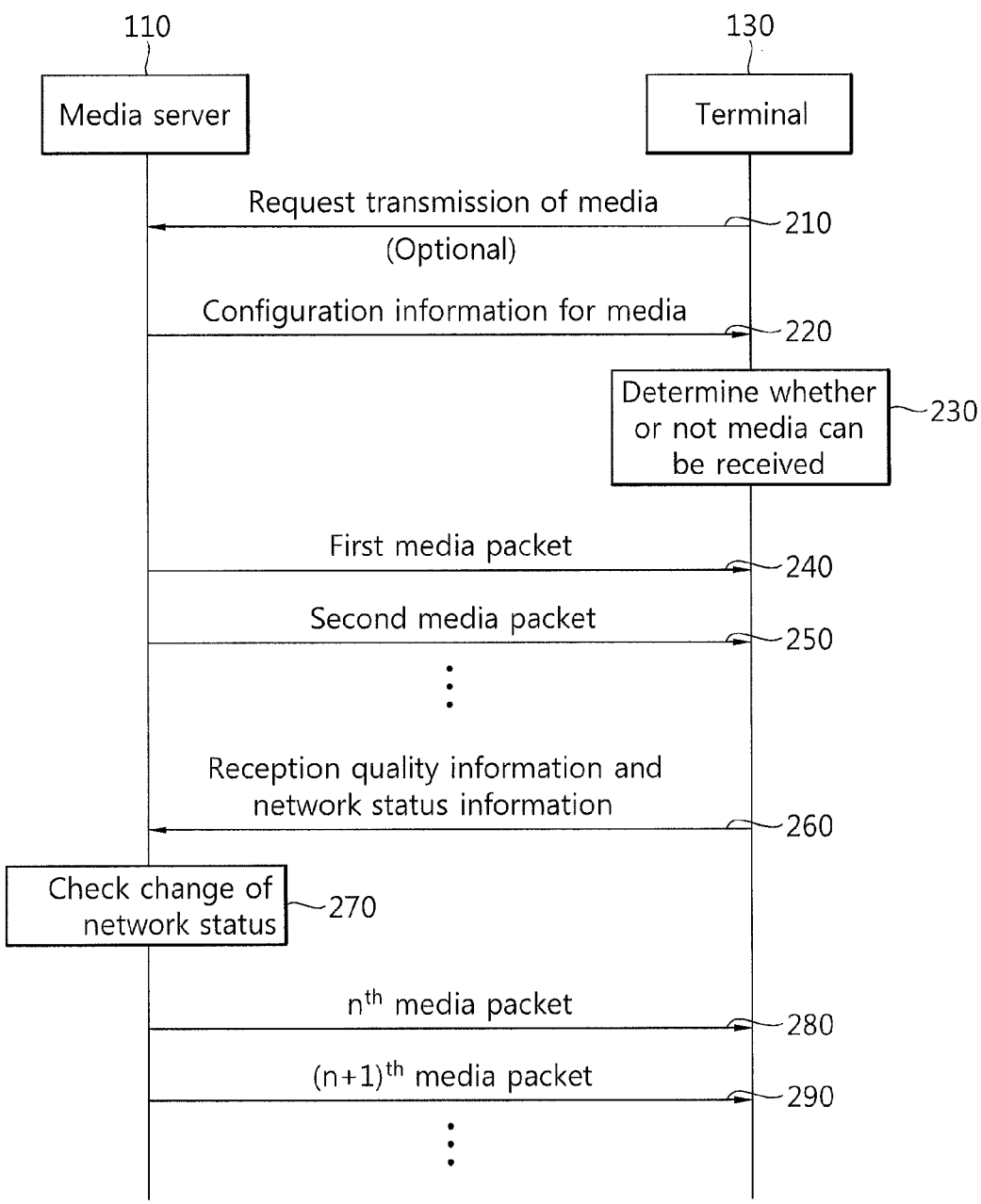
FIG. 2 is a flowchart illustrating a process of providing, by the media server, media streaming service to the terminal in accordance with an embodiment of the present invention.

FIG. 2 is a flowchart illustrating a process of providing, by the media server, media streaming service to the terminal in accordance with an embodiment of the present invention.

If a user tries to view specific media, the terminal 130 requests the media server 110 to send the specific media (210). The request 210 may be transmitted to the media server 110 through an explicit message or may be delivered to the media server 110 through an inexplicit method, such as a method of selecting the specific media in a web page. Accordingly, the terminal 130 may optionally send a message that requests the transmission of the media to the media server 110.

When the transmission of the media is requested by the terminal 130, the media server 110 sends a message including configuration information for the media to the terminal 130 (220). Here, the message including the configuration information may include information about the transport characteristic of the media by media server 110. The message may further include information about a method of sending reception quality information for the media that is transmitted by the media server 110.

The configuration information may include information about elements (e.g., video, audio, an image, a widget, and text) that make up one medium and information about a method of representing media, such as the size and position of each of the elements that are represented on a screen. For example, the configuration information may be Composition Information (CI) defined in MPEG Media Transport (MMT).

Meanwhile, the information about a transport characteristic may include Quality of Service (QoS) of corresponding media, a necessary buffer size, the highest transfer rate, a loss allowance level, etc. For example, the information about a transport characteristic may be Asset Delivery Characteristics (ADC) defined in the MMT.

Furthermore, the information about a method of sending reception quality information may include pieces of information about contents that will be included in the reception quality information, a period in which the reception quality information is transmitted, and a network status at a point of time at which the reception quality information is transmitted. The terminal 130 may send the message including the reception quality information to the media server 110 periodically or when there is a great change in reception quality based on the information about a method of sending the reception quality information.

When the configuration information for the requested media is received from the media server 110, the terminal 130 determines whether or not the media can be received based on the configuration information (230). If, as a result of the determination, it is determined that the reception of the media is impossible, the terminal 130 disconnects a connection with the media server 110 without additional notification and terminates the reception of the media. The media server 110 does not take any specific behavior for the termination of the reception of the terminal 130 because it sends the media to a plurality of terminals. In contrast, if, as a result of the determination, the reception of the media is possible, the terminal 130 waits to receive the media from the media server 110, and the media server 110 sends the media, corresponding to a transport characteristic defined in the configuration information for the media, in a packet form (240, 250).

Media packets (e.g., a first media packet and a second media packet) for the media requested by the terminal 130 are sequentially transmitted to the terminal 130. Each of the media packets includes time information about a point of time at which the media packet was sent. Accordingly, the terminal 130 can measure the reception quality of the media packet using the time information. Here, information about a time interval in which the media packets are received may be used to measure the reception quality of the media packet. In general, media packets are transmitted at similar time intervals by the media server 110. However, each of the media packets may be received by the terminal 130 early or late depending on a network status.

When the media packets are received, the terminal 130 measures quality for the received media packets. For example, the terminal 130 may measure the reception quality of a first media packet when receiving the first media packet and measure the reception quality of a second media packet when receiving the second media packet. Thereafter, the terminal 130 arranges reception quality measurement results in a form instructed by the media server 110 using the configuration information for the media and sends a message, including information about the reception quality of the received media packets, to the media server 110 (260). Here, the message including the reception quality information also includes information about the network status of the terminal 130. The message including the reception quality information may include, for example, information about measurement duration, a packet loss rate, an inter-arrival jitter of packets, propagation delay, a feedback time, a peak bit rate, and buffer fullness.

The measurement duration indicates duration (e.g., a second unit) for which the reception status of a media packet was measured, and the packet loss rate indicates a ratio that a media packet is not received due to a loss of the media packet for the measurement duration. The inter-arrival jitter of packets indicates an average interval (e.g., millisecond unit) in which two media packets are received for the measurement duration, and the propagation delay indicates an average time (e.g., millisecond unit) that is taken for a media packet to be transmitted for the measurement duration. The feedback time indicates the time when the terminal 130 has sent a status information message for the measurement duration, the information about a peak bit rate indicates a peak bit rate in which a media packet was received by the interface of the terminal 130 for the measurement duration, and the information about buffer fullness indicates a level of an available space that remains in the buffer of the terminal 130 for the measurement duration.

When the message including the reception quality information is received from the terminal 130, the media server 110 determines whether or not there is a change in the network status of the terminal 130 by checking the network status of the terminal 130 based on the message (270). If, as a result of the determination, it is determined that there is no change in the network status of the terminal 130, the media server 110 continues to send next media packets (e.g., an $n^{th}$ media packet and an $(n+1)^{th}$ media packet) in the same form as that of the first media packet and the second media packet that have been previously transmitted (280, 290). Meanwhile, the network status of the terminal 130 may be frequently changed. Accordingly, the terminal 130 may continue to measure the reception quality of all media packets that make up the media until all the media packets are fully received.

Figure 3:
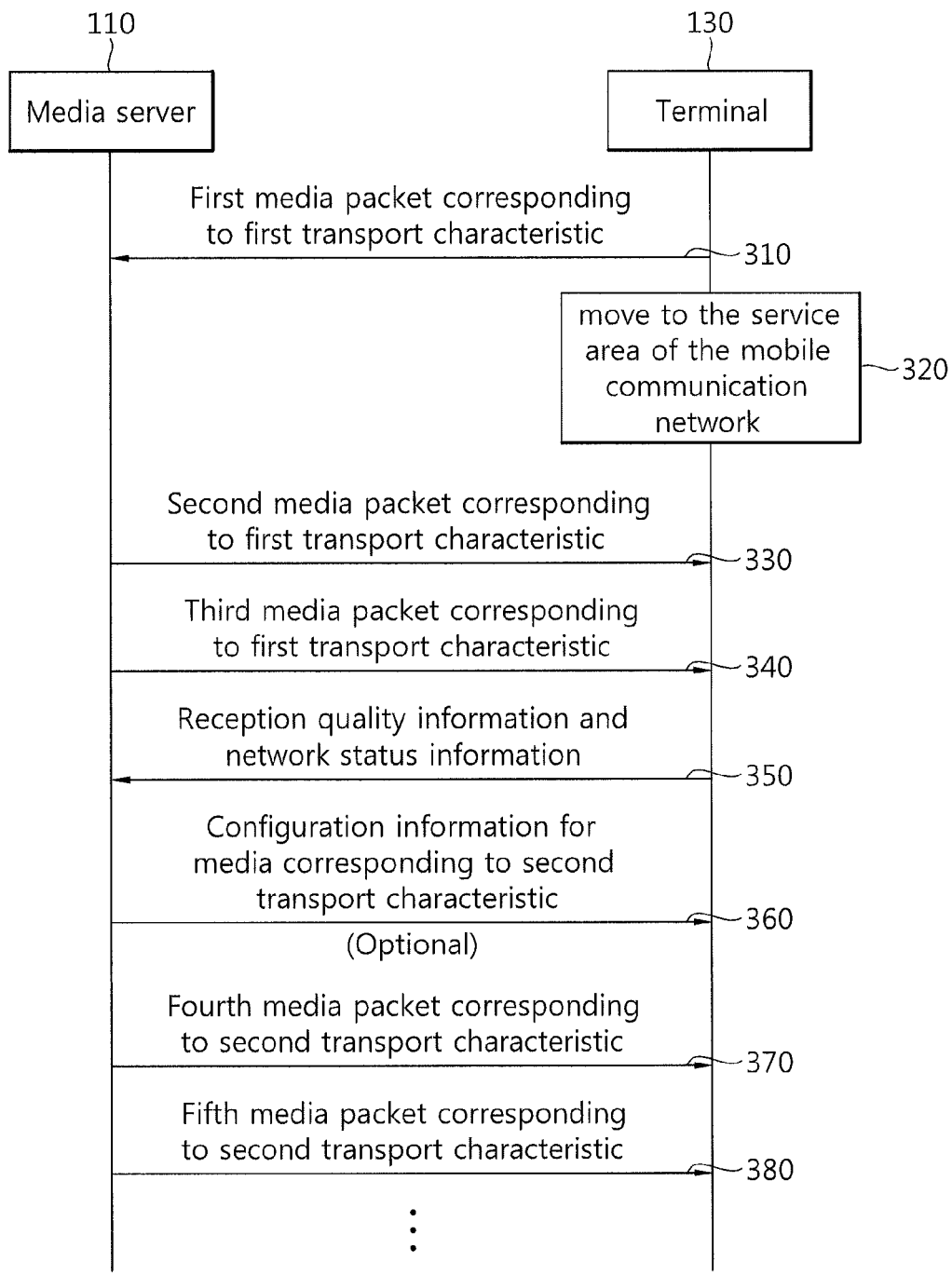
FIG. 3 is a flowchart illustrating a process of dynamically selecting, by the media server, media having the most suitable transport characteristic from two media having different transport characteristics in response to a change in the reception status of the terminal and sending the selected media in accordance with an embodiment of the present invention.

FIG. 3 is a flowchart illustrating a process of dynamically selecting, by the media server, media having the most suitable transport characteristic from two media having different transport characteristics in response to a change in the reception status of the terminal and sending the selected media in accordance with an embodiment of the present invention.

The media server 110 may have a plurality of media having different transport characteristics. Furthermore, the media server 110 may have media that include two or more media packets having different transport characteristics like media to which Scalable Video Coding (SVC) has been applied. For example, a process of adaptively sending, by the media server 110, two media having different transport characteristics, that is, media having a first transport characteristic and media having a second transport characteristic, to the terminal 130 is described below.

The media having the first transport characteristic may be suitable for being transmitted to a terminal that is placed in the Wi-Fi service area, and the media having the second transport characteristic may be suitable for being transmitted to a terminal that is placed in the service area of the mobile communication network. In this case, when the terminal 130 is placed in the Wi-Fi service area, the media server 110 sends the media having the first transport characteristic packet to the terminal 130 (310). When the media having the first transport characteristic packet is received from the media server 110, the terminal 130 measures the reception quality of a corresponding media packet. Here, the measured reception quality is normal because the media server 110 has sent the media having the first transport characteristic packet, which is suitable for being transmitted to a terminal placed in a Wi-Fi service area.

Although the terminal 130 moves to the service area of the mobile communication network (320), the media server 110 sends a second media packet and a third media packet that make up the media having the first transport characteristic to the terminal 130 (330, 340). In such a case, however, the reception quality of the second media packet and the third media packet is deteriorated because the terminal 130 is placed in the service area of the mobile communication network. If the deterioration of the reception quality is measured as described above, the terminal 130 arranges the results of the reception quality of the second media packet and the third media packet and sends a message including reception quality information to the media server 110 (350).

The terminal 130 has been illustrated as measuring the reception quality of the two media packets and sending the reception quality information, but the terminal 130 may send reception quality information when it is checked that the reception quality of one media packet is deteriorated. Furthermore, FIG. 3 shows an example in which the terminal 130 sends reception quality information when it measures the deterioration of the reception quality of a media packet. For example, the terminal 130 may periodically send reception quality information.

When the message including the reception quality information is received from the terminal 130, the media server 110 recognizes that there is a change in the network environment of the terminal 130, selects the media having the second transport characteristic, that is, media currently most suitable for the network environment of the terminal 130, and sends media packets that make up the selected media to the terminal 130. Here, the media server 110 may notify the terminal 130 that a transport characteristic of the media has been changed by sending a message, including configuration information for the media having the second transport characteristic, to the terminal 130 (360). When the message including configuration information for the media having the second transport characteristic is received, the terminal 130 determines whether or not the media can be received. If, as a result of the determination, it is determined that the reception of the media is impossible, the terminal 130 disconnects a connection with the media server 110 without additional notification and terminates the reception of the media.

Meanwhile, the message including configuration information for the media having the second transport characteristic may be optionally transmitted. For example, if the media server 110 sends configuration information for the media having the first transport characteristic, together with the configuration information for the media having the second transport characteristic, to the terminal 130, step 360 may not be performed because the terminal 130 already knows the configuration information for the media having the second transport characteristic.

If the terminal 130 can receive the media having the second transport characteristic, the media server 110 sends a fourth media packet and a fifth media packet that make up the media having the second transport characteristic to the terminal 130 (370, 380). Here, the fourth media packet corresponds to a media packet that will be played back next to the third media packet in the terminal 130.

The media terminal 130 continues to measure the reception quality of received media packets and sends media reception quality information to the media server 110 if necessary or periodically.

Figure 4:
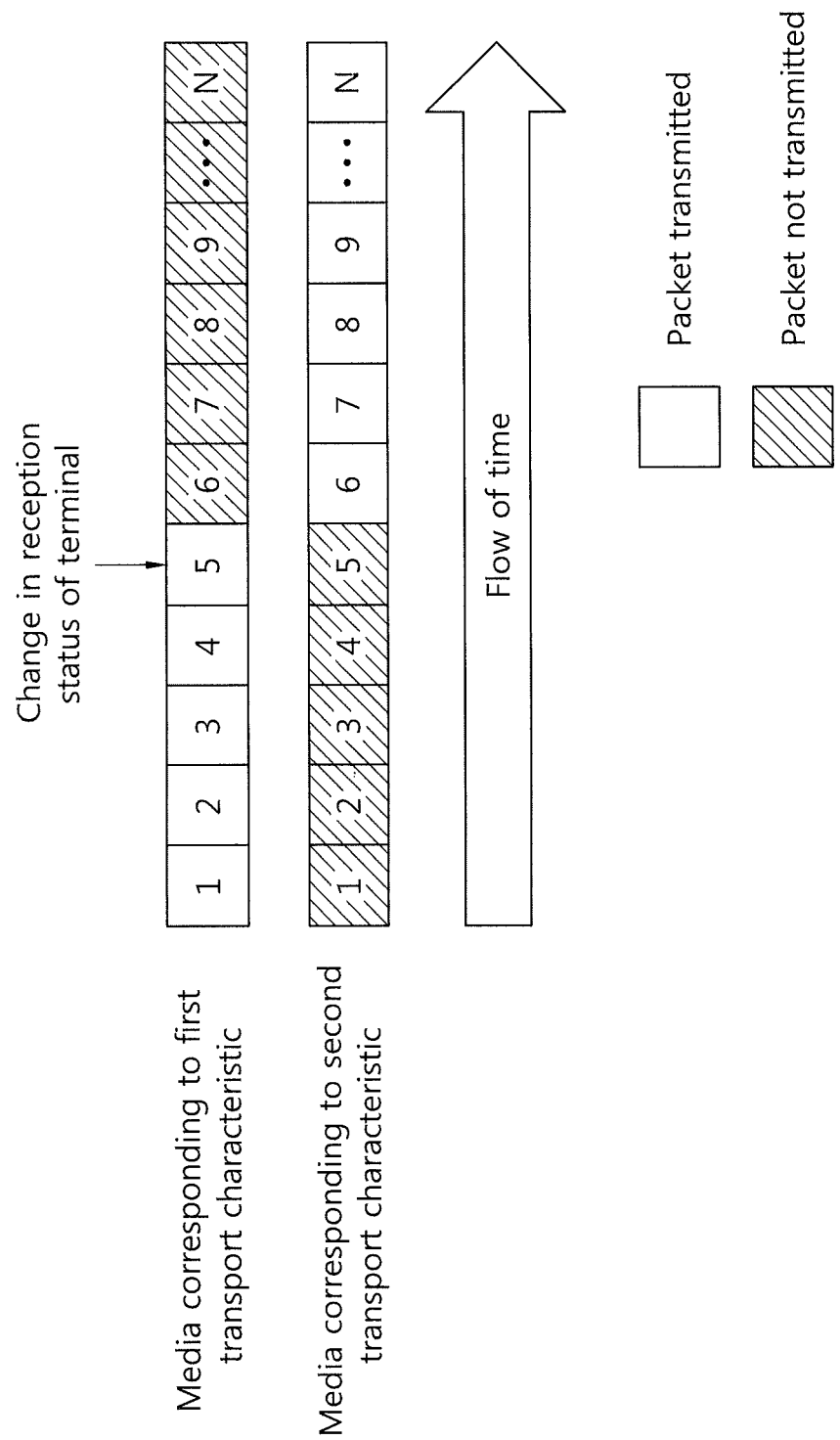
FIG. 4 is a diagram illustrating order of media packets that are transmitted when two media having different transport characteristics are changed and transmitted in accordance with an embodiment of the present invention.
Figure 5:
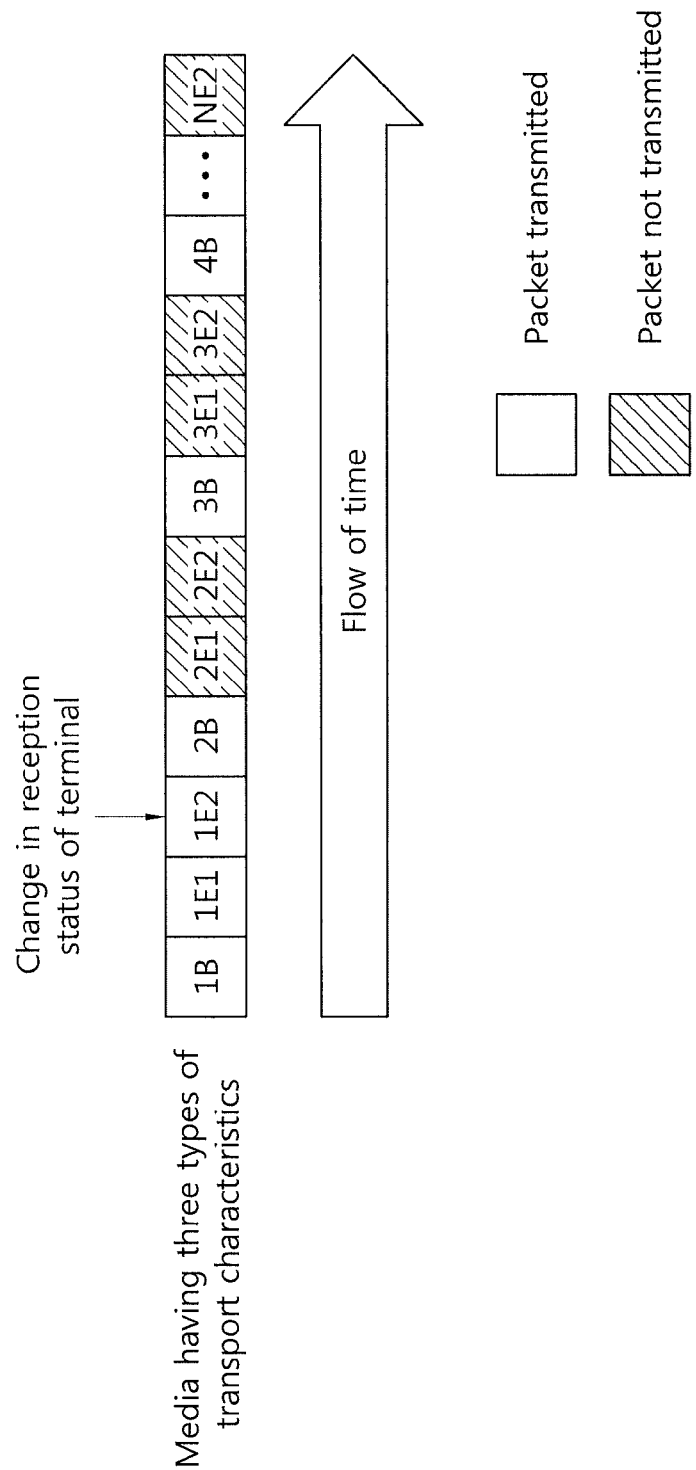
FIG. 5 is a diagram illustrating order of media packets that are transmitted when media including media packets having three different transport characteristics are transmitted in accordance with an embodiment of the present invention.

FIG. 4 is a diagram illustrating order of media packets that are transmitted when two media having different transport characteristics are changed and transmitted in accordance with an embodiment of the present invention, and FIG. 5 is a diagram illustrating order of media packets that are transmitted when media including media packets having three different transport characteristics are transmitted in accordance with an embodiment of the present invention.

Media owned by the media server 110 may be basically divided into two types. One type is of a type in which all media packets forming one medium have the same transport characteristic, and the other type is of a type in which media packets forming one medium have different transport characteristics. Media of a type in which media packets forming one medium have different transport characteristic is used in a layered coding scheme, such as SVC. An example in which the media server 110 sends media in which all media packets forming one medium have the same transport characteristic is first described below.

If media having a first transport characteristic is changed while the media server 110 sends the media, that is, if it is necessary to send media having a second transport characteristic, the media server 110 sends media packets starting from a media packet having a next presentation time that is next to a media packet already received by the terminal 130, of media packets that make up the media having the second transport characteristic. Here, the presentation time refers to the time when a corresponding media packet is played back.

For example, as shown in FIG. 4, when the media server 110 recognizes a change in the reception status of the terminal 130 while sending media packets from a media packet having a first presentation time to a media packet having a fifth presentation time, of N (N is a natural number) media packets corresponding to a first transport characteristic, the media server 110 sends media packets starting from a media packet having a sixth presentation time that belong to N media packets corresponding to a second transport characteristic. In FIG. 4, the media corresponding to the first transport characteristic may be high-capacity media, and the media corresponding to the second transport characteristic may be middle or low-capacity media. A number indicated in each of the media packets indicates the presentation time of each media packet. The terminal 130 plays back the media in order of the presentation time.

Meanwhile, if the media server 110 recognizes a change in the reception status of the terminal 130 while sending media having three types of different transport characteristics, the media server 110 may send corresponding media packets as shown in FIG. 5. Referring to FIG. 5, media having three types of different transport characteristics may include base layer packets 1B, 2B, . . . , NB and enhanced layer packets 1E1, 1E2, 2E1, 2E2, . . . , NE1, and NE2 in accordance with layered coding. When only media packets corresponding to the base layer B are received, the terminal 130 may play back corresponding media with the lowest quality. When only a base layer packet B and a first enhanced layer packet E1 are received, the terminal 130 may play back corresponding media with middle quality. When all the base layer packet B, the first enhanced layer packet E1, and a second enhanced layer packet E2 are received, the terminal 130 may play back corresponding media with high quality. Hierarchically coded media, such as that shown in FIG. 5, may include one or more enhanced layer packets, and the type of quality is increased according to an increase of the layers.

When the media server 110 is notified of a change in the reception status of the terminal 130 while sending all the packets of media having three types of different transport characteristics, the media server 110 may send only the base layer packet B and may not send the enhanced layer packets E1 and E2 from that time.

Figure 6:
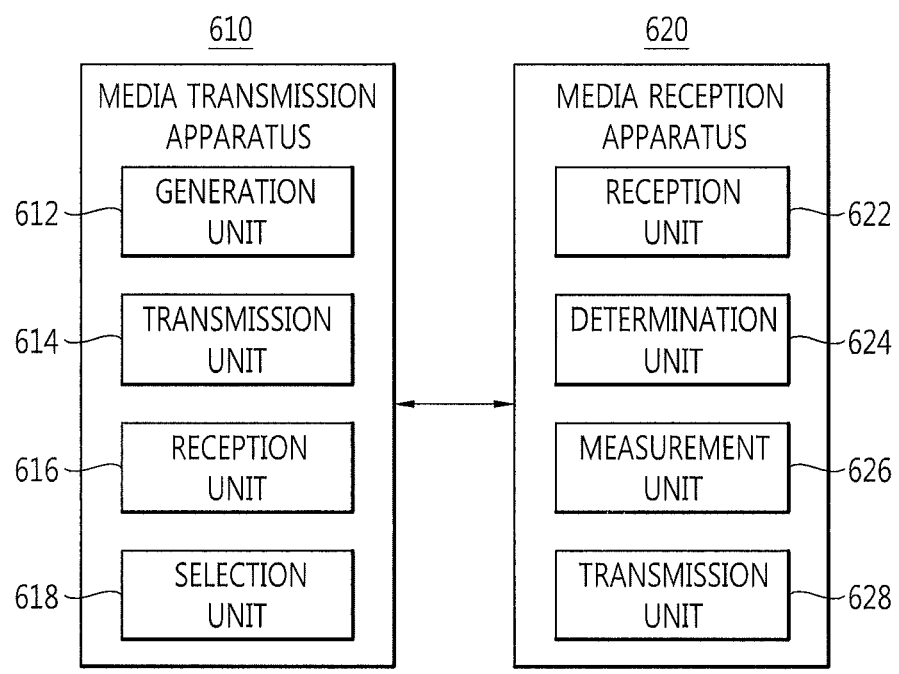
FIG. 6 is a block diagram of a media transmission apparatus and a media reception apparatus in accordance with an embodiment of the present invention.

FIG. 6 is a block diagram of a media transmission apparatus and a media reception apparatus in accordance with an embodiment of the present invention.

The media transmission apparatus 610 includes a generation unit 612, a transmission unit 614, a reception unit 616, and a selection unit 618. The media reception apparatus 620 includes a reception unit 622, a determination unit 624, a measurement unit 626, and a transmission unit 628. The media transmission apparatus 610 may be the media server, and the media reception apparatus 620 may be the terminal that receives media from the media server.

The media transmission apparatus 610 may own at least one of a plurality of media having different transport characteristics and media including media packets having two or more different transport characteristics. For this reason, for example, the media transmission apparatus 610 may include a memory device for storing a plurality of media. The memory device may be provided as a device separated from the media transmission apparatus 610. In this case, the media transmission apparatus 610 may receive media, requested by the terminal, from the memory device.

The generation unit 612 of the media transmission apparatus 610 generates a message including configuration information for media requested by the media reception apparatus 620. The message including the configuration information may include at least one of information about a transport characteristic of the media requested by the media reception apparatus 620 and information about a method of sending reception quality information for the media.

The transmission unit 614 sends the message, generated from the generation unit 612, to the media reception apparatus 620 and sends a media packet that makes up the media. Here, the media packet transmitted to the media reception apparatus 620 may include time information for a point of time at which the media packet was transmitted.

The reception unit 616 receives reception quality information for the media packet from the media reception apparatus 620. The reception quality information may be measured based on at least one of the time information for a point of time at which the media packet was transmitted and information about a time interval in which corresponding media packets are received. For example, the reception unit 616 may receive a message that includes the reception quality information and information about the network status of the media reception apparatus 620. The message including the reception quality information and the information about the network status of the media reception apparatus 620 may include duration for which the reception status of a corresponding media packet was measured, a loss rate of the media packet received for the duration, an average interval in which two media packets are received for the duration, the time taken to send a media packet for the duration, the time when the terminal sent a status information message for the duration, a peak bit rate for the duration, and information about buffer fullness in the media reception apparatus 620 for the duration.

The selection unit 618 selects a media packet having a transport characteristic corresponding to the reception quality information received from the reception unit 616. The selection unit 618 can recognize a change in the network environment of the media reception apparatus 620 based on the reception quality information received from the media reception apparatus 620. In such a case, the selection unit 618 can select a media packet that makes up media currently most suitable for the network environment of the media reception apparatus 620.

When the selection unit 618 selects a media packet making up media that is currently most suitable for the network environment of the media reception apparatus 620, the transmission unit 614 sends the selected media packet to the media reception apparatus 620.

Meanwhile, the reception unit 622 of the media reception apparatus 620 receives configuration information for media, requested by the media reception apparatus 620, from the media transmission apparatus 610 and receives a media packet that makes up the media. Here, the media packet may include time information about a point of time at which the media packet was sent.

The determination unit 624 determines whether or not the media can be received based on the configuration information received from the media transmission apparatus 610. If, as a result of the determination, it is determined that the reception of the media is impossible, the media reception apparatus 620 may disconnect a connection with the media transmission apparatus 610 without additional notification and terminate the reception of the media.

The measurement unit 626 measures the reception quality of the media packet received from the media transmission apparatus 610. For example, the measurement unit 626 may measure the reception quality of the media packet based on at least one of time information about a point of time at which the media transmission apparatus 610 has sent the media packet and information about a time interval in which media packets are received.

The transmission unit 628 sends a message, including information about the reception quality of the media packet measured by the measurement unit 626 based on the configuration information received from the media transmission apparatus 610, to the media transmission apparatus 610.

Thereafter, the reception unit 622 may receive a media packet, having a transport characteristic corresponding to the reception quality, from the media transmission apparatus 610.

In accordance with the present invention, the media server can dynamically send media that is most suitable for a terminal depending on a reception capability of the terminal in an environment in which the media server provides streaming service to a plurality of terminals at the same time.

Furthermore, a large function does not need to be added to a terminal, and dynamic adaptation streaming service can be provided to a terminal.

While some exemplary embodiments of the present invention have been described with reference to the accompanying drawings, those skilled in the art may change and modify the present invention in various ways without departing from the essential characteristic of the present invention. Accordingly, the disclosed embodiments should not be construed as limiting the technical spirit of the present invention, but should be construed as illustrating the technical spirit of the present invention. The scope of the technical spirit of the present invention is not restricted by the embodiments, and the scope of the present invention should be interpreted based on the following appended claims. Accordingly, the present invention should be construed as covering all modifications or variations derived from the meaning and scope of the appended claims and their equivalents.

What is claimed is:

1. A media transmission method by a media transmission apparatus, comprising:
   sending a first message, comprising configuration information for media requested by a terminal, to the terminal;
   sending, to the terminal, a first media packet comprising first data corresponding to a first transport characteristic and second data corresponding to a second transport characteristic;
   receiving, from the terminal, a second message comprising reception quality information for the first media packet based on the configuration information; and
   sending, to the terminal, a second media packet comprising the first data in response to determining that a reception status of the terminal is changed based on the reception quality information for the first media packet,
   wherein the second message comprises a duration for which a reception status of the first media packet was measured, a loss rate of the first media packet received for the duration, an average interval in which two media packets are received for the duration, a time taken to send the first media packet for the duration, a time when the terminal sent a status information message for the duration, a peak bit rate for the duration, and information about buffer fullness remaining in the terminal for the duration which is used in MPEG Media Transport (MMT),
   wherein a connection between the media transmission apparatus and the terminal is disconnected without notification to the media transmission apparatus upon determining that a reception of the media requested is impossible based on the configuration information,
   wherein the first message comprising the configuration information includes information about a transport characteristic of the media and information about a method of sending reception quality information for the media, and
   wherein the information about a method of sending reception quality information for the media includes pieces of information about contents included in the reception quality information, a period in which the reception quality information is transmitted, and a network status at a point of time at which the reception quality information is transmitted.

2. The media transmission method of claim 1, wherein the first message comprises information about a transport characteristic of the media including Quality of Service (QoS) of the media, a necessary buffer size, the highest transfer rate, and a loss allowance level.

3. The media transmission method of claim 1, wherein the first media packet comprises time information about a point of time at which the first media packet was transmitted.

4. The media transmission method of claim 1, wherein the reception quality information is measured based on at least one of time information about a point of time at which the first media packet was transmitted and information about a time interval in which the first media packet and the second media packet are received.

5. A media transmission apparatus, comprising:
   a generation unit for generating a first message comprising configuration information for media requested by a terminal;
   a transmission unit for sending the generated first message, and a first media packet comprising first data corresponding to a first transport characteristic and second data corresponding to a second transport characteristic;
   a reception unit for receiving a second message comprising reception quality information for the first media packet based on the configuration information from the terminal; and
   a selection unit for selecting a second media packet comprising the first data in response to determining that a reception status of the terminal is changed based on the reception quality information for the first media packet,
   wherein the transmission unit sends the second media packet to the terminal,
   wherein the second message comprises a duration for which a reception status of the first media packet was measured, a loss rate of the first media packet received for the duration, an average interval in which two media packets are received for the duration, a time taken to send the first media packet for the duration, a time when the terminal sent a status information message for the duration, a peak bit rate for the duration, and information about buffer fullness remaining in the terminal for the duration which is used in MPEG Media Transport (MMT),
   wherein a connection between the media transmission apparatus and the terminal is disconnected without notification to the media transmission apparatus upon determining that a reception of the media requested is impossible based on the configuration information,
   wherein the first message comprising the configuration information includes information about a transport characteristic of the media and information about a method of sending reception quality information for the media, and
   wherein the information about a method of sending reception quality information for the media includes pieces of information about contents included in the reception quality information, a period in which the reception quality information is transmitted, and a network status at a point of time at which the reception quality information is transmitted.

6. The media transmission apparatus of claim 5, wherein the first message comprises at least one of information about a transport characteristic of the media including Quality of Service (QoS) of the media, a necessary buffer size, the highest transfer rate, and a loss allowance level.

7. The media transmission apparatus of claim 5, wherein the first media packet comprises time information about a point of time at which the first media packet was transmitted.

8. The media transmission apparatus of claim 5, wherein the reception quality information is measured based on at least one of time information about a point of time at which the first media packet was transmitted and information about a time interval in which the first media packet and the second media packet are received.

9. A method of receiving, by a media reception apparatus, media, the method comprising:
- receiving a first message comprising configuration information for the media from a media server;
- receiving a first media packet comprising first data corresponding to a first transport characteristic and second data corresponding to a second transport characteristic from the media server;
- measuring a reception quality of the first media packet;
- sending a second message comprising information about the measured reception quality to the media server based on the configuration information; and
- receiving a second media packet comprising the first data in response to determining that a reception status of the terminal is changed based on the reception quality for the first media packet from the media server,
- wherein the second message comprises a duration for which a reception status of the first media packet was measured, a loss rate of the first media packet received for the duration, an average interval in which two media packets are received for the duration, a time taken to send the first media packet for the duration, a time when the terminal sent a status information message for the duration, a peak bit rate for the duration, and information about buffer fullness remaining in the terminal for the duration which is used in MPEG Media Transport (MMT),
- wherein a connection between the media transmission apparatus and the terminal is disconnected without notification to the media transmission apparatus upon determining that a reception of the media requested is impossible based on the configuration information,
- wherein the first message comprising the configuration information includes information about a transport characteristic of the media and information about a method of sending reception quality information for the media, and
- wherein the information about a method of sending reception quality information for the media includes pieces of information about contents included in the reception quality information, a period in which the reception quality information is transmitted, and a network status at a point of time at which the reception quality information is transmitted.

10. The method of claim 9, wherein the first media packet comprises time information about a point of time at which the first media packet was transmitted.

11. The method of claim 10, wherein the measuring of the reception quality comprises measuring the reception quality of the first media packet based on at least one of time information about a point of time at which the first media packet was transmitted and information about a time interval in which the first media packet and the second media packet are received.

* * * * *